United States Patent
Mahler et al.

(10) Patent No.: US 6,675,218 B1
(45) Date of Patent: Jan. 6, 2004

(54) SYSTEM FOR USER-SPACE NETWORK PACKET MODIFICATION

(75) Inventors: Jerry Mahler, Prospect Heights, IL (US); Michael Borella, Naperville, IL (US); Guido Schuster, Des Plaines, IL (US); Ikhlaq Sidhu, Vernon Hills, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/134,496

(22) Filed: Aug. 14, 1998

(51) Int. Cl.[7] .............................................. G06F 15/16
(52) U.S. Cl. ........................ 709/230; 370/229; 370/230; 370/230.1; 370/231; 370/232; 370/233; 370/234; 370/235
(58) Field of Search ................................. 395/285, 500; 709/230–245; 370/229–235

(56) References Cited

U.S. PATENT DOCUMENTS

| | | | | |
|---|---|---|---|---|
| 5,548,731 A | * | 8/1996 | Chang et al. ................. | 709/310 |
| 5,721,876 A | * | 2/1998 | Yu et al. ....................... | 709/249 |
| 6,148,336 A | * | 11/2000 | Thomas et al. .............. | 709/224 |
| 2001/0027496 A1 | * | 10/2001 | Boucher et al. ............. | 709/250 |

OTHER PUBLICATIONS

Dittia, Z.D. TheAPIC approach to high performance network interface design: protected DMA and other techniques, Apr. 1997,IEEE Comput. Soc. Press, vol. 2, pp. 823–831.*

Archie Cobbs, Freebsd Kernel Interfaces Manual (divert(4)), http://www.anr.mcnc.org/~divert/doc/freebsd--man.*

Blott, Stephen NetTap: An Efficient and Reliable PC–Based Platform for Network Programming, 2000, Bell Laboratories, pp. 13–22.*

Mogul, Jeffrey C. The Packet Fiter: An Efficient Mechanism for User–level Network Code, Nov. 1987, ACM pp. 39–51.*

Thekkath, Chanramohan A. Implementing Network Protocols at User Level Sep. 1993, IEEE, pp. 554–565.*

McCanne et al. "The BSD Packet Filter: A New Architecture for User–level Packet Capture" Dec., 1992 pp. 1–17.*

Kitayama et al. "Real–Time Communication in Distributed Environment Real–Time Packet Filter Approach" Mar. 1997 pp. 10–17.*

(List continued on next page.)

*Primary Examiner*—John Follansbee
*Assistant Examiner*—Charles E Anya
(74) *Attorney, Agent, or Firm*—McDonnell Boehnen Hulbert & Berghoff

(57) ABSTRACT

A system for user-space packet modification, including a set of kernel code and a user-level application programming interface (API). The system facilitates creation of a special socket for passing packets between kernel space and user space. The system in turn facilitates creation and application of a packet filter associated with the socket, in order to trap incoming or outgoing packets being processed in the kernel at a designated point in a protocol stack. Once a packet is trapped, it is moved through the socket into user space, thereby at least temporarily preventing the protocol stack from further processing the packet. In user space, an application may operate on the packet, for instance, modifying aspects of the packet or deleting the packet altogether. The system in turn facilitates injection of a packet from user space into kernel space, and into a designated point in the protocol stack for desired stack processing.

26 Claims, 3 Drawing Sheets

Microfiche Appendix Included
(2 Microfiche, 161 Pages)

OTHER PUBLICATIONS

*Windows Network Data and Packet Filtering*, http://www.ndis.com/papers/winpktfilter.htm, pp. 1–7, printed from the World Wide Web on Jan. 9, 2003.

Bot J. Kees, *Rarpd–reverse Address Resolution Protocol Daemon*, http://www.cs.vu.nl/pub/minix/2.0.0/wwwman/man8/rarpd.8.html, pp. 1–3, printed from the World Wide Web on Jan. 10, 2003.

McCanne, Steven, *Bpf(4)–Berkeley Packet Filter*, http:www.gsp.com/cgi–bin/man.cgi?section=4&topic=bpf, pp. 1–7, printed from the World Wide Web on Jan. 10, 2003.

McCanne et al., "The BSD Packet Filter: A New Architecture for User–Level Packet Capture," Proceedings of the 1993 Winter USENIX Technical Conference (Jan. 1993).

* cited by examiner

SYSTEM FOR USER-SPACE NETWORK PACKET MODIFICATION

MICROFICHE APPENDIX

This document contains a microfiche appendix consisting of 2 sheets of microfiche and a total of 161 frames.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates in general to packet switched telecommunications networks and more particularly to a system for allowing user-space modification of packets transmitted through a network.

2. Description of the Related Art

In a packet switched network, a message to be sent is divided into blocks, or data packets, of fixed or variable length. The packets are then sent individually over the network through multiple switches or nodes and then reassembled at a final destination before being delivered to a target device or end user. To ensure proper transmission and re-assembly of the blocks of data at the receiving end, various control data, such as sequence and verification information, is typically appended to each packet in the form of a packet header. At the receiving end, the packets are then reassembled and the message is transmitted to the end user in a format compatible with the user's equipment.

As is well known in the art, most packet switched networks operate according to a set of established protocol layers, collectively defining a protocol stack. Each layer of the protocol stack exists to perform a specific function, such as addressing, routing, framing and physical transmission of packets. When a data packet is to be transmitted over a network from a source machine to a destination machine, the packet will pass in a downward direction through layers of the protocol stack on the source machine, and in an upward direction through corresponding layers of the protocol stack on the destination machine.

Each layer of the protocol stack in the transmitting process may add a respective header to the packet, which provides information to the corresponding layer in a receiving process. Thus, as a packet passes down through the protocol stack on a transmitting machine, the packet may gain an additional header at each layer. At the bottom of the stack, the transmitting process may then frame the data and physically transmit it over the network toward its destination. When the packet reaches its destination, the packet will then pass up through the protocol stack. Each layer of the stack in the receiving process may obtain useful information from its associated header and will strip its header from the packet before passing the packet up to the next layer for processing. At the top of the stack, the packet may then be processed by an application or user program.

The layers at the top of a protocol stack are typically designed to provide end-to-end communication between source and destination machines on the network. For instance, the top layers may provide packet sequence information and encryption. Lower layers of the stack, on the other hand, often provide information to facilitate communication between immediately adjacent machines in the network. For instance, the lower layers in the stack may provide network address information, for use in routing packets through the network.

A variety of packet switching protocols are known. These protocols include, for instance, TCP/IP, Novell's SPX/IPX, Apple Computer's Appletalk, and Microsoft's NetBEUI. Of these protocols, the best known is the TCP/IP suite, which is used to manage transmission of packets throughout the Internet and other IP networks. For purposes of illustration, but without limitation, the present invention will be described with reference to the TCP/IP suite.

The TCP/IP protocol stack includes, from lowest to highest, a link layer, a network or "IP" layer, a transport layer and an application layer. The link layer includes network interface card drivers to connect the machine to the physical network, such as an Ethernet network. The IP layer provides addressing information to facilitate independent routing of packets within or between networks and also includes other control layers, such as an "ICMP" (Internet Control Message Protocol) layer and an "ARP" (Address Resolution Protocol) layer. The transport layer allows source and destination machines to carry on a conversation with each other and includes a connection-oriented "TCP" (Transmission Control Protocol) layer and a connectionless "UDP" (User Datagram Protocol) layer. Finally, the application layer includes application programs that carry out the functionality of a network device and interface with a user.

In general, the machines that implement the protocol stack in a packet switched network (including, without limitation, source machines, destination machines, packet switches and routers) are computers. Each of these computers includes a processor, a memory, and an input/output port, and is managed by an operating system.

As is known in the art, the operating system of a computer typically distinguishes between two types of code: kernel code, and application code. Kernel code is the core of the operating system, handling matters such as process scheduling, memory management, hardware communication and network traffic processing. Application code, on the other hand, is the code used by applications, such as word processors, spreadsheets, games and compilers. In operation, kernel code and application code are stored in separate portions of memory and are each executed by the computer processor (or multiple processors). Thus, kernel code is said to be running in "kernel space," and application code is said to be running in "user space." Applications may, however, use the kernel to access system resources and hardware through system calls, and are therefore thought of as running above, or on top of, the kernel.

In a typical network-capable computer, part of the protocol stack is implemented in kernel space and part is implemented in user space. For reference, the part that is implemented in kernel space may be referred to as the "kernel stack" (carried out by "kernel stack code"), and the part that is implemented in user space may be referred to as the "application stack" (carried out by "application stack code"). Considering the TCP/IP protocol suite, for instance, the link, network and transport layers are each implemented by kernel stack code running in kernel space, and the application layer is implemented by application stack code running in user space. FIG. 1 illustrates this arrangement by way of example.

When a packet passes between the application and transport layers of the TCP/IP protocol stack, the packet moves between user space and kernel space. Since user space and kernel space are separate areas of memory, however, the process of moving a packet typically includes copying the packet to the destination area and then deleting the original. Thus, in practice, once an incoming packet reaches the top of the kernel protocol stack, it is copied to user space to be processed by the application layer of the stack, and it is then deleted from kernel space. Similarly, once an outgoing packet has been processed by the application layer in user space, it is copied to kernel space to be processed by the remainder of the protocol stack, and it is then deleted from user space.

In general, when an incoming packet enters a computer or other hardware device running a protocol stack, the destination of the packet may be some specific code within the kernel, or it may be an application running in the application layer. In any event, the packet will typically be processed by multiple layers of the protocol stack finally arriving at its destination. Similarly, an outgoing packet will typically be processed by multiple layers of the protocol stack before being transmitted onto the network.

Referring to FIG. 1, for instance, assume that an incoming UDP packet arrives at a destination machine for receipt and processing by an application. When the UDP packet arrives, the Ethernet (link) layer will detect that a type of IP packet has arrived, will strip the link layer header from the packet, and will pass the packet to the IP layer. The IP layer will then determine that the packet is a UDP packet destined for an application on the machine, and will strip the IP header from the packet and pass the packet to the UDP layer. In turn, the UDP layer will determine which application is to receive the packet, will strip the UDP header from the packet, and will pass the packet to that destination application.

As another example, a similar set of events occurs when an incoming packet arrives for processing within the kernel, such as for routing or echo processing. With reference to FIG. 1 again, consider the "ping" program, for instance. According to the "ping" mechanism, one computer sends an ICMP echo request over the network to another computer, and the receiving computer sends an ICMP echo reply message to the originating machine. When a "ping" packet arrives at a computer, the Ethernet layer will detect that a type of IP packet has arrived and will pass it to the IP layer. The IP layer will then determine that the packet is an ICMP packet and will pass it to the ICMP processing code (part of the IP layer). The ICMP processing code will in turn determine that the packet is an echo request packet and will pass the packet to a kernel code routine or "ping" routine that responds to echo requests.

Traditionally, applications running in user space have been able to view and operate on packets only when the packets originate in user space or once the packets pass up through the protocol stack into the application layer. Recently, however, computer programmers and network administrators have seen a need to be able to monitor packet traffic through the network and analyze in user-space packets that are being processed by the kernel stack code. For this purpose, many operating systems now provide the ability for user-level processes to "sniff" or "capture" network traffic, by employing "packet taps" in kernel space.

In the existing art, a packet tap is a piece of kernel code that examines each packet passing through a particular point in the protocol stack and sends a copy of certain packets to an application running in user space. Often, a packet tap will apply specified criteria such as a predefined "packet filter" to identify those packets that are to be copied to user space. Alternatively, the packet tap may copy all packets into user space, for processing by an application. Typically, the packet filter will be inserted in the kernel code just above the link layer of the protocol stack, in order to monitor packets flowing to and from the network interface card.

An example of one such packet filter is the "BSD Packet Filter" or "Berkeley Packet Filter" (BPF), as described in McCanne et al., "The BSD Packet Filter: A New Architecture for User-Level Packet Capture," Proceedings of the 1993 Winter USENIX Technical Conference (Jan. 1993), which is available on most BSD-derived systems. Another example is the "Data Link Provider Interface" (DLPI), as described in Data Link Provider Interface Specification, Unix International (Aug. 1991), which is available on Solaris, HP-UX and SCO Unix platforms. Still other examples exist, such as the "Linux Socket Filter" (LSF) mechanism, which is BPF-like kernel space filtering code provided in kernel 2.1.75 and higher of the increasingly popular Linux operating system.

Existing packet taps provide a useful mechanism for user-space monitoring of network packet traffic. However, these packet taps do not provide means for altering the packets in user space or for changing the flow of packets. In particular, while packet taps may advantageously identify a packet in the kernel and copy the packet to user space, the original packet (from which the copy was made) will continue to be processed through the protocol stack and on to its destination. In many cases, by the time the application sees the packet, the packet will have already been fully processed by the kernel stack code.

Those skilled in the art may also be familiar with "raw sockets," which allow a user-level process to read and write certain IP packets with an IP header that is not processed by the kernel. A "raw socket" thus effectively allows a user-level process to receive copies of certain incoming packets with their TCP/IP headers intact, and to send into the kernel IP packets with user-specified TCP/IP headers. Raw sockets, however, are inherently limited. For instance, a raw socket cannot be used to receive certain types of IP packets, such as TCP or UDP packets, in user space. Further, a raw socket cannot copy an outgoing packet to user space after modification by the stack. For example, if a user wishes to specify the IP header of a TCP/IP packet using a raw socket, the user must specify both the TCP header and the IP header before sending the packet to the raw socket. No mechanism exists in a raw socket to allow the protocol stack to fill in the TCP header and then allow the user to specify the IP header. Additionally, a raw socket will not allow a user-level process to write packets into the kernel stack in an incoming (upward direction).

In view of the deficiencies in the art, a need therefore exists to provide a system by which a user space application can modify or otherwise manipulate packet traffic over a network.

SUMMARY OF THE INVENTION

The present invention provides a method and apparatus for enabling user-space modification of packets. According to a principal aspect of the invention, an improved packet tap is placed at a designated spot in the kernel stack code and employs a packet filter. Upon detection of a packet that matches the filter, the tap intercepts the packet and moves it from kernel space into user space, at least temporarily preventing the kernel from continuing to process the packet. Upon receipt of the packet in user space, an application may then operate on the packet as desired. For instance, (i) the application may modify the packet in some way, (ii) the application may delete the packet from memory (thereby eliminating the packet), or (iii) the application may do nothing to the packet (thereby effectively performing a null operation on the packet). In turn, assuming the packet has not been deleted, the application may inject the packet back into the protocol stack in the kernel for further conventional processing.

FIG. 2 illustrates schematically how packets can be intercepted from the protocol stack, examined or modified in user-space, and then returned to the protocol stack according to the invention. Although the figure illustrates such a mechanism between the Ethernet driver, IP layer and TCP layer, the present invention contemplates placing the tap anywhere in the protocol stack.

Advantageously, the present invention may be implemented with a lightweight modification to kernel code, and an associated application programming interface (API). Provided with the collective ability to divert packets from the kernel stack to user space and inject packets back into the kernel stack from user space, a program running in user space may then examine and manipulate packets on their way through the kernel stack. In addition, provided with the ability to divert packets from the kernel stack to user space, a program running in user space may effectively "drop" packets from the kernel stack.

The functionality of the present invention will prove useful for a variety of tasks. As an example, if a programmer wishes to develop a new protocol in TCP/IP that resides at the same level as IP, one method of implementing the protocol would have been to add a specialized protocol handler in the kernel, similar to the "ping" and "IP router" handlers shown in FIG. 1. As is known in the art, however, the process of writing, debugging and implementing such kernel code can be time consuming and difficult. For instance, a simple error in kernel code (such as an illegal reference to memory) can cause the kernel to crash, requiring the user to reboot the computer system. With the present invention, however, a programmer can advantageously implement the new IP protocol as a user-level application.

Programming code for execution in user space is easier than programming code for execution in kernel space, because applications can be written using a wide range of pre-existing user libraries. Further, debugging user-level code is easier than debugging kernel code, due to the availability of powerful user-level debugging programs. Still further, in most cases, an error in application code will cause only that application to crash, rather than causing the kernel to crash, thereby minimizing the need to reboot the system.

As another example, the present invention may allow a programmer to test existing or new protocols. For instance, assume a programmer wishes to examine the effect of packet loss during a file transfer using ftp over TCP/IP. By applying the present invention, the programmer can intercept all ftp-packets from just above the network interface card driver in the kernel stack and can divert those packets to an application in user space. The user-level application may then drop certain packets and inject others back into the kernel stack to continue processing up the protocol from the point where they were intercepted.

These and other objects and advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

A preferred embodiment of the present invention enables user-space manipulation of packets by providing a lightweight modification to kernel system code and an associated API for user programming. For convenient reference, but without limitation, the preferred embodiment of the invention may be referred to as a "packet modification library" or "PML," and an executable set of machine language instructions that implement PML in kernel space and user space may be referred to, respectively, as "PML kernel code" and "PML application code" or "PML API." Provided with the present invention, a programmer may write an application that calls functions defined by the PML API, in order to set up desired packet taps and move packets between kernel space and user space. As will be discussed below, the microfiche appendix to this document contains an exemplary C and C++ source code listing, which illustrates how the invention can be implemented in practice in the context of the well known "LINUX" operating system.

Figure 1:
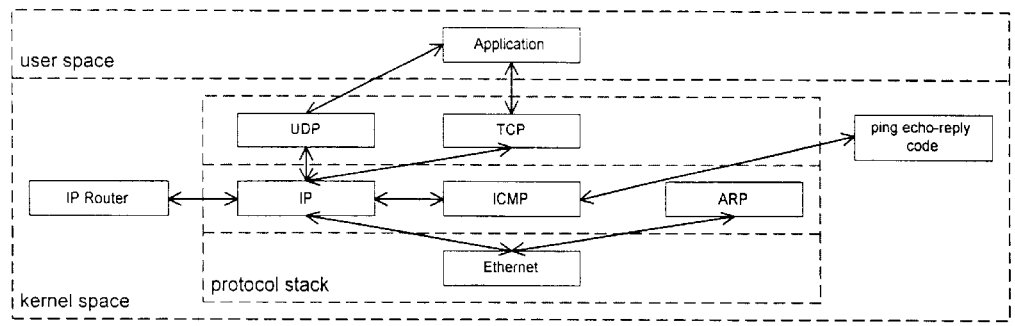
FIG. 1 is a block diagram illustrating the interoperation and division of a TCP/IP protocol stack between user space and kernel space in network-capable computer system.
Figure 2:
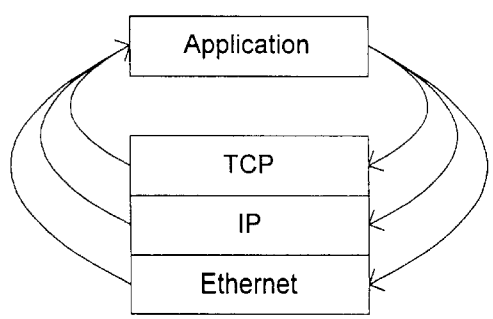
FIG. 2 is a block diagram illustrating packet flow according to an embodiment of the present invention.
Figure 3:
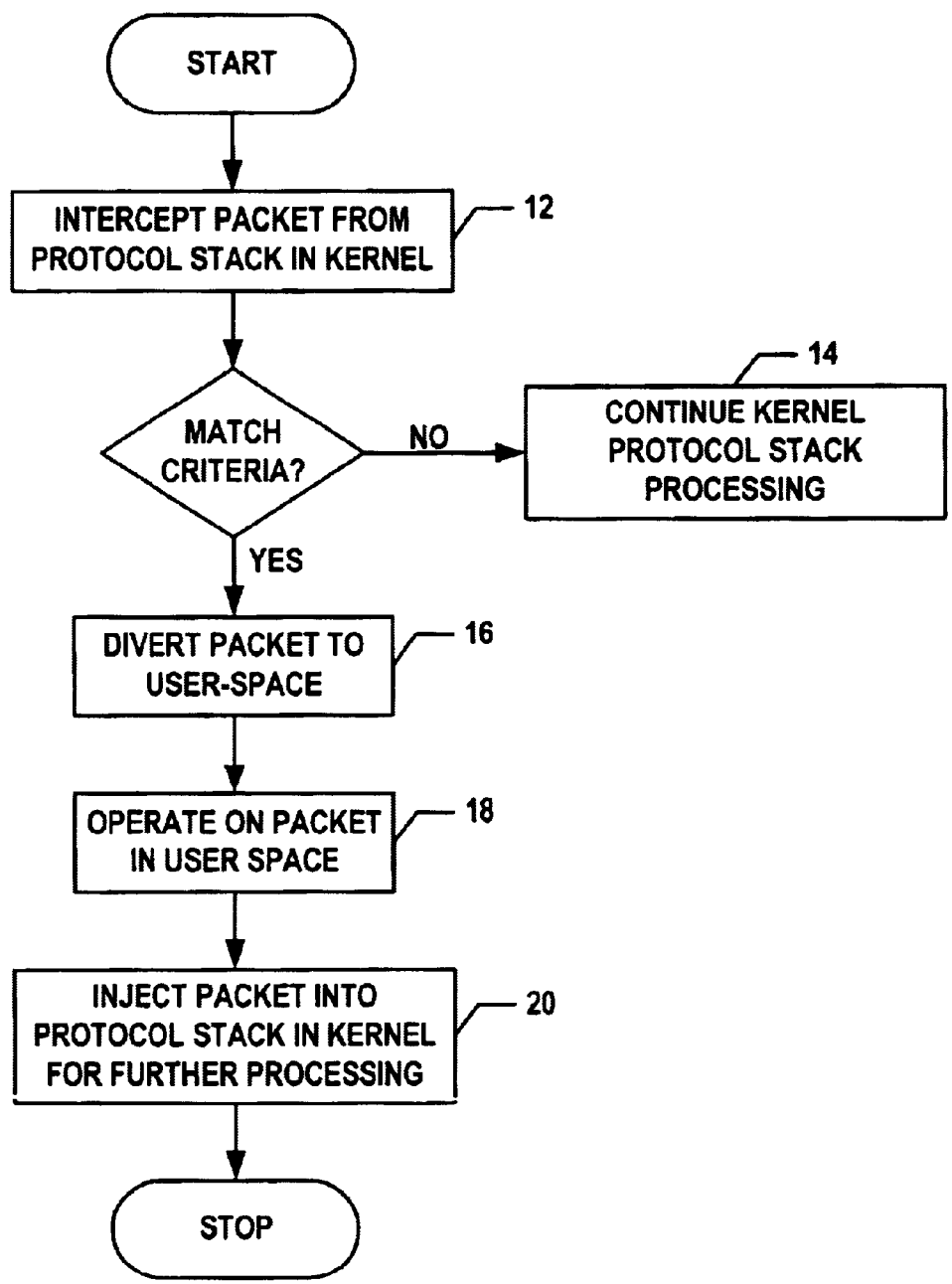
FIG. 3 is a flow chart illustrating generally the functions of a preferred embodiment of the present invention.

Referring to the drawings, FIG. 3 is a flowchart illustrating generally the principle functions provided by a preferred embodiment of the invention. As shown in FIG. 3, at step 12, a packet that is being processed by the kernel stack code is intercepted by PML kernel code to determine whether the packet matches predefined criteria. If the packet does not match the predefined criteria, then, at step 14, the kernel stack code continues conventional processing of the packet. If, however, the packet matches the predefined criteria, then, at step 16, PML diverts the packet to user space, at least temporarily preventing the kernel stack code from further processing the packet. It should be noted that the predefined criteria may be such that each and every packet meets the criteria, in which case all packets are diverted into user space. At step 18, an application in user space may then examine and operate on the packet, which may involve modifying or deleting the packet or, alternatively, doing nothing at all to the packet. At step 20, assuming the packet has not been deleted, PML application code may then inject the packet into the kernel stack for further processing by the kernel stack code.

As noted above, user space and kernel space are separate areas of memory. Programs operating in user space do not interfere with programs operating in kernel space, and vice versa. However, applications in user space may access hardware devices and other system resources (such as kernel memory space) by calling functions that are implemented at least in part by kernel code. Examples of these function-calls in a UNIX-based operating system such as LINUX are the file I/O (input/output) commands "open", "close", "read", "write", and "ioctl." When the kernel receives an "open" command designating a desired path and filename, for instance, the kernel allocates memory in kernel space for a "file structure," which will hold pointers to the beginning and end of the file on a disk, as well as pointers to the kernel functions that implement the "close", "read", "write", and "ioctl" user-space function calls. In addition, the kernel returns to the calling application a pointer "file_desc" to the file structure. In turn, the "read" and "write" commands will cause the kernel to copy data, respectively, from the disk file into user space, or from user space into the disk file.

To facilitate operation of the preferred embodiment, PML preferably modifies the functions of these conventional file I/O commands so as to provide a "gateway" or "PML socket" through which packets can pass between kernel space and user space. In particular, when PML application code requests the kernel to "open" a special file in a special predetermined directory, kernel code will recognize the special file as a PML file. The kernel will then allocate memory in kernel space for a file structure as usual. This file structure, however, will contain pointers to the PML kernel functions which implement the "close", "read", "write", and "ioctl" user-space function calls for this special file. In addition, the PML kernel "open" function will allocate space in the kernel for a "packet queue" to hold pointers to trapped packets. Thereafter, when PML application code seeks to "read" from that "file," a read thread created by PML kernel code will wait until a packet pointer is present in the packet queue and will then move the associated trapped packet into user space and delete the packet from kernel space. Similarly, when PML application code seeks to "write" a packet to the file, PML kernel code will move the packet into kernel space, and PML application code will delete the packet from user space.

Figure 4:
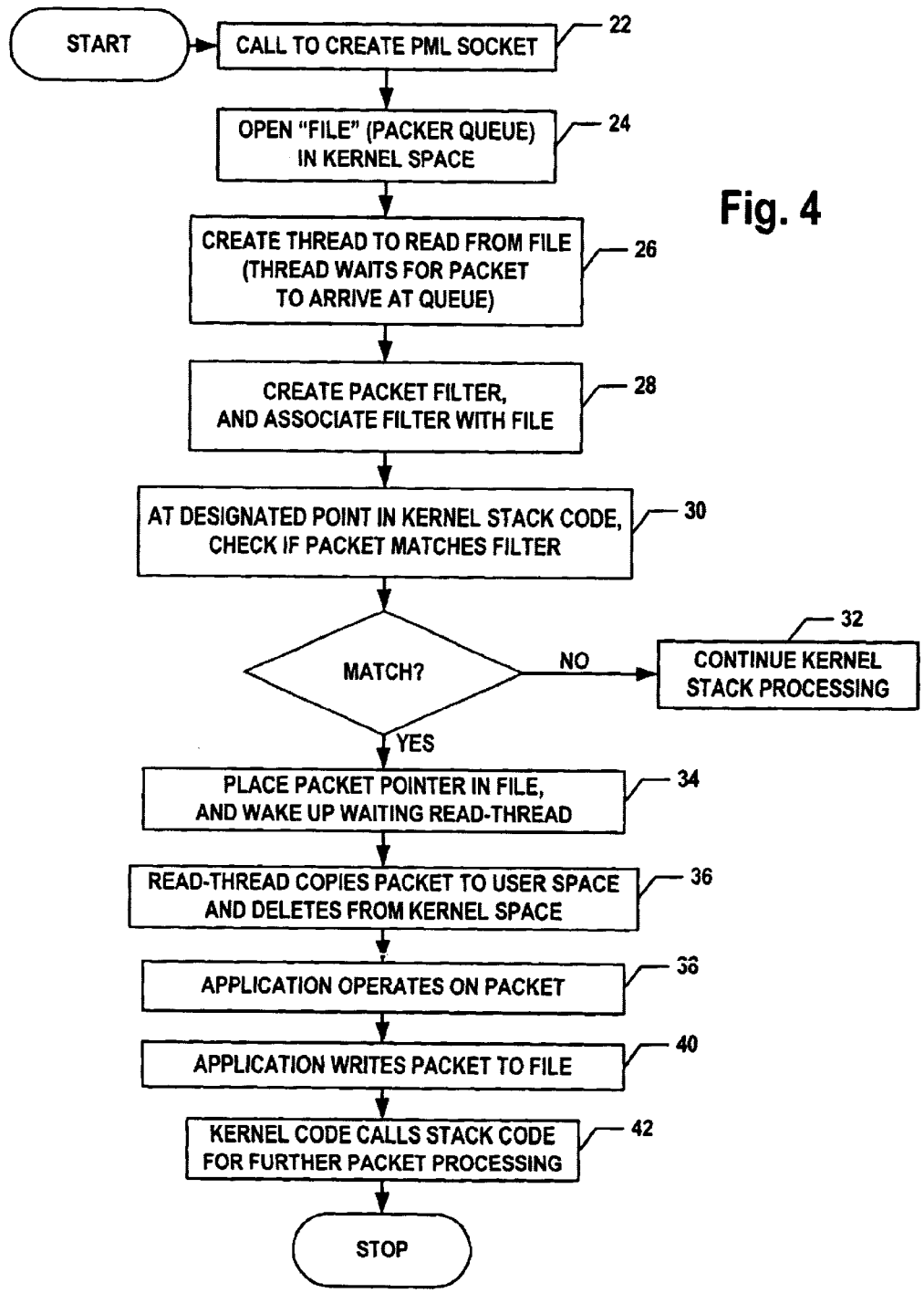
FIG. 4 is a flow chart illustrating in greater detail the functions of a preferred embodiment of the present invention.

With this understanding, FIG. 4 next illustrates in greater detail the process flow of a preferred embodiment of the invention. Referring to FIG. 4, at step 22, an application running in user space first seeks to create a PML socket, through which the application will receive packets trapped by the PML kernel code. To do so, the application preferably calls a "CPMLSocket::create()" function, which is defined by the PML application code.

In response to the CPMLSocket::create( ) function call, the PML application code preferably calls the "open" function and requests the operating system to open a file with a unique name and in a unique directory, thereby signaling to PML kernel code that this is not an ordinary "open" command but is rather a PML "open" command. The unique file name may be "PMLxxxx", where "xxxx" represents a unique file number. Further, the unique directory may be the "/dev" directory, which is a restricted directory present on all UNIX-based operating systems, and which ordinarily would not be accessible to user-level programs.

When the kernel code receives this "open" command, it will set up a file structure in memory as discussed above, which would normally be used to hold a pointer to a file on disk. In addition, the kernel will conventionally return to the calling application a "file_desc" pointer to the memory location of the file structure. According to the preferred embodiment, however, a set of PML kernel code monitors file I/O commands received from user space and recognizes that the "open" command issued by the application is a PML "open" command rather than a conventional open command. In response, at step 24 in FIG. 4, the PML kernel code will open a PML socket for the requesting application.

More specifically, to open a PML socket, the PML kernel code will preferably allocate space in memory for a "packet queue," which will hold pointers to trapped packets requested by the application. In addition, the PML kernel code will store in an otherwise unused "private_data" field of the file structure a pointer to the newly created packet queue. This pointer may be used later by the PML kernel code to erase (i.e., release) the packet queue memory space when the application is no longer waiting to receive trapped packets, such as when the application seeks to "close" the PML socket.

Still further, when the PML kernel code opens a PML socket, it preferably increments a counter in memory, which indicates how many applications have opened PML sockets. (As those skilled in the art will appreciate, this counter may instead reflect how many PML filters are in place, as will be discussed below). The counter should serve to tell the operating system whether it needs to apply any PML packet filters in an effort to tap packets from the stack. If the counter, is set to zero, then the PML kernel code will know that no PML packet filters exist, or that no applications have set up PML sockets. This counter is preferably initiated to zero when the system is booted.

After the PML application code calls the "open" function and thereby sets up a packet queue in kernel space for the requesting application, the PML application code allocates memory in the user space to hold a trapped packet using the well known "malloc( )" function. The PML application code then calls a "read" function, seeking to "read" from the "PMLxxxx" file just created. As arguments of this "read" command, the PML application code provides (i) the "file_desc" pointer to the "PMLxxxx" file and (ii) a pointer to the memory space that it allocated to hold a trapped packet.

As indicated above, a "read" command would normally cause the kernel to read from a conventional file. According to the preferred embodiment, however, kernel code recognizes that the "read" command seeks to read from the "PMLxxxx" file in the "/dev" directory and therefore handles the command as a PML "read" command rather than as a conventional "read" command.

At step 26 in FIG. 4, the PML kernel code responds to a PML "read" command by creating in kernel space a process thread that seeks to read from the packet queue pointed to by the file structure. Since the packet queue does not yet contain any pointers to trapped packets, however, this read-thread will remain dormant in a loop, waiting for a trapped packet. In the preferred embodiment, in order to later identify and wake up the waiting thread, the PML kernel code will store in a header to the packet queue a process ID (or PID) number, which uniquely identifies the read-thread. When the read-thread awakens from its dormant state as will be discussed below, the thread will refer to the packet queue as identified by the "private_data" field in the file structure, and the thread will retrieve from the packet queue a pointer to a trapped packet.

Once the PML application code has established a PML socket and set up a waiting read-thread as described above, the application running in user space may provide the PML kernel code with a packet filter for use in trapping and diverting desired packets. To do so, at step 28, the application preferably first creates and defines a PML filter object for the socket and then "adds" the filter to the PML socket.

To create a PML filter object, the application first calls a CFilter::create( ) function, which is defined by the PML application code. In response to a CFilter::create( ) function call, the PML application code will allocate memory in user space to store a filter structure (i.e., the filter object) and will return to the calling application a pointer the CFilter object. The PML application code defines properties for the CFilter object, including "mask" and "match" properties. After creating the filter object, an application may set these properties, respectively, with CFilter::setMask( CFilter* )

and CFilter::setMatch( CFilter* ) functions, which are also defined by the PML application code. The mask property defines the type of information to be identified by the filter, and the match property defines the specific information to be matched according to the mask. For instance, if a packet tap is to look for a packet string that has five bits, but the application is only interested in the first three bits of the string, the mask might be "11100". In turn, if the packet tap is to look for such packet strings that have "110" as their leftmost three bits, then the match property for the filter might be "11000."

After creating a PML packet filter and defining the properties of the filter, an application may instruct PML to implement the filter, in order to trap and divert the packets as specified by the filter. In the preferred embodiment, the PML application code provides a CPMLSocket::addFilter (CFilter*) function, which an application may call in order to add a filter to a PML socket.

When an application calls the CPMLSocket: :addFilter (CFilter*) function, the PML application code will preferably respond by calling a function known as "ioctl" (Input/Output Control). The ioctl function is a file-type dependent function available in most UNIX based systems, which programmers may use to tell the kernel certain things about how an application is to receive data. According to the preferred embodiment, however, the ioctl command will have the following arguments: (i) "file_desc", which points to the kernel file structure whose private_data field identifies the packet queue associated with the calling application, (ii) a predetermined integer (such as 1), which will instruct the PML kernel code to add a filter for that file_desc, and (iii) "filter_spec", which points to the filter object stored in user space.

In response to this ioctl add-filter function call, the PML kernel code will allocate memory space in the kernel to hold the filter structure. In turn, the PML kernel code will call a function conventionally known as "memcpy_fromfs( )", which will copy the filter structure from user space into the location allocated for the filter in kernel space. In addition, the PML kernel code maintains a "filter list" of pointers to all PML filters that currently exist in the kernel, each together with a pointer to the file structure whose private_data field points to the packet queue associated with the calling application. Therefore, the PML kernel code will also respond to the ioctl add-filter command by adding to this filter list a pointer to the filter which in turn points to the associated packet queue.

Provided with a PML socket and a PML packet filter associated with a calling application, the PML kernel code may then apply the packet filter in an effort to tap and divert packets for the application. According to the preferred embodiment, the PML kernel code may place a packet tap, also referred to as "PML tap code," at any desired point in the kernel stack code. For instance, the PML tap code may be placed just above the data link layer of the stack and may look for packets flowing up or down through the protocol stack. In one embodiment of the invention, the desired location of the packet tap may be specified by a calling application, and the PML kernel code may respond by "jumping" to PML tap code at the specified location in the kernel stack code.

In the preferred embodiment, when a packet arrives at a packet tap, the PML tap code checks the list of PML packet filters (referenced by pointers) to see if the packet matches one or more filters, as shown at step 30 in FIG. 4. If the tap code does not find a match, then, at step 32, the tap code returns control to the kernel stack code for continued stack processing. If, however, the tap code finds a match, then the tap code begins the process of diverting the packet from the kernel stack into user space.

To divert a packet into user space, the tap code first locates the packet queue associated with the filter, by referring to the pointer to the packet queue stored in the filter. As shown at step 34 in FIG. 4, the tap code then saves in this packet queue a pointer to the packet, which is currently stored in kernel space. Further, by reference to the PID stored in the packet queue header, the kernel PML code then identifies and wakes up the waiting read-thread in kernel space.

As noted above, when the read-thread awakens from its dormant or "blocked" state, the thread will then refer to the packet queue identified by the "private_data" field of the file structure, and the thread will retrieve from the packet queue the pointer to the trapped packet. In turn, by reference to the file_desc pointer in the read command, the read-thread will divert the trapped packet to user space. In doing so, the PML kernel code will first create a special PML packet header, which will identify information about the packet such as (i) where in the protocol stack the packet was trapped, (ii) which direction in the protocol stack (up or down) the packet was moving when it was trapped, (iii) the "device number" identifying the device (e.g., a particular network interface card, in the case of a router) that processed the packet or that is to process the packet, and (iv) the length of the packet.

According to the preferred embodiment, the read-thread will then pass the packet and its PML header to user space, as shown at step 36 in FIG. 4. To do so, the read-thread will (a) prepend the PML packet header to the packet, (b) copy the packet with its PML header into to the memory location allocated by the PML application code and specified in the "read" call, and (c) delete the packet from kernel space. To delete the packet from kernel space, the PML kernel code may use the function "kfree_skb" or "dev_kfree_skb", which is conventionally available in UNIX-based systems such as LINUX to delete packets after the kernel stack completes normal packet processing. By copying the packet to user space and deleting it from kernel space, PML thus removes the packet at least temporarily from further processing by the kernel stack code.

According to the preferred embodiment, when the PML application code receives the trapped packet, the PML application code may create a C++ object called "CPML-Packet" that represents the trapped packet. The CPML-Packet object preferably includes a member function entitled "getHeader( )", which will return a pointer to the PML packet header. In addition, the CPMLPacket object preferably includes other member functions that return specific information carried by the PML header. For example, (i) a "getTrapLocFld()" function will preferably return an indication of where the packet was trapped from the kernel stack, as well as the direction the packet was moving through the stack when it was trapped, and (ii) a "getDeviceNumFld( )" function will return an indication of which device did or will handle the packet.

In addition, once the PML application code receives a trapped packet, it calls a function entitled "CPMLSocket::onRecvData( )". CPMLSocket::onRecvData( ) is a preferably a user-programmable PML function provided by the PML application code, which defines what the PML application code will do with a trapped packet. A programmer may write a routine to customize this function through a C++ function override, and the PML application code will execute the custom routine in response to the CPMLSocket::onRecvData() function call. Absent a customized CPMLSocket::onRecvData( ) routine, however, the PML application code preferably defines a default routine, which the PML application code will execute in response to the CPMLSocket::onRecvData( ) function call. This default routine preferably instructs the PML application code to simply inject the trapped packet back into the protocol stack, as will be described below.

In the preferred embodiment, as shown at step 38 in FIG. 4, the PML application code may thus operate on the trapped packet in user space, as defined by the CPMLSocket::onRecvData( ) function. This operation may take any of a variety of forms, including, for example, (i) altering the packet and/or the PML packet header, (ii) deleting the packet from user space, or (iii) simply examining or doing nothing at all to the packet (which may be considered a "null" operation on the packet). In turn, if the packet has not been deleted, the CPMLSocket::onRecvData( ) function may direct the PML application code to inject the packet back into the protocol stack in kernel space for further stack processing.

Altering a packet and/or its PML header may take any of a variety of forms, limited in large part only by the imagination of a programmer. For example, the CPMLSocket::onRecvData( ) function may be programmed to call the CPMLPacket::getTrapLocFld( ) function to determine the direction that the packet was being processed when it was diverted from the protocol stack. Assuming that the function returns a flag indicating that the packet was being processed in an upward (incoming) direction, the CPMLSocket::onRecvData( ) function may then be programmed to change the flag to indicate that the packet is to be processed instead in a downward direction (outgoing) by the protocol stack. Similarly, the application may determine from information in the PML packet header that the packet was trapped just above the IP layer of the protocol stack, and the application may change that information to indicate that the packet should be processed from just above the TCP layer instead.

Rather than altering the packet, the CPMLSocket::onRecvData( ) function can be programmed to delete a trapped packet from user space. Deleting a trapped packet from user space will effectively "drop" the packet from further stack processing. This operation can thus advantageously allow a programmer to simulate packet loss. For instance, if an incoming packet is diverted to user space from just above the TCP layer of the stack (i.e., just before the packet passes up into the application layer) and then deleted from user space, the application that was destined to receive the packet will assume that the packet was lost in transmission. In this way, PML will allow programmers to implement and test user-level transmission protocols and packet handling routines for responsiveness to packet loss.

The default CPMLSocket::onRecvData( ) routine effectively executes a single command, "CPMLSocket::sendPacket( CPacket* )," which serves to inject a packet into the protocol stack in kernel space. Similarly, a custom-programmed CPMLSocket::onRecvData() function may include this command in order to inject a packet into the protocol stack. In response to the CPMLSocket::sendPacket( CPacket* ) command from a calling application, the PML application code preferably calls the "write" function, as shown at step 40 in FIG. 4, and seeks to write the packet to the "PMLxxxx" file associated with the calling application. To identify the packet to be "written," one of the arguments of the "write" command is preferably a pointer to the CPacket object in user space.

As indicated above, a "write" command would normally cause the kernel to write to a conventional file. According to the preferred embodiment, however, PML kernel code recognizes that the "write" command seeks to write to the "PMLxxxx" file in the "/dev" directory and therefore handles the command as a PML "write" command rather than as a conventional "write" command.

In response to a PML "write" command that seeks to inject a packet into the stack, the PML kernel code examines the PML packet header to identify properties of the packet. These properties may include those discussed above, such as where the packet is to continue to be processed in the protocol stack, what direction (up or down) the packet is to flow from that point in the protocol stack, and what device (e.g., which network card) is to handle the packet (in the case of an outgoing packet).

The PML kernel code then copies the packet from user space to kernel space (after which, the PML application code may delete the packet from user space) and calls a designated line of the kernel stack code in order to begin, continue or complete stack processing of the packet. In the preferred embodiment, the PML kernel code may identify the appropriate line of the kernel stack code by reference to a table keyed to the parameters of the PML packet header. For example, if the header indicates that the packet is to be processed in an outgoing direction from just below the TCP layer, then the table may specify the point in the stack code that will carry on outgoing packet processing from that point. As shown at step 42 in FIG. 4, the PML kernel code will call that point of the stack code, thereby completing injection of the packet into the stack.

Provided with the functionality described above, the present invention beneficially enables a user to trap packets from any desired point in the kernel stack, operate on those packets in user space, and inject packets into the kernel stack for processing. Several examples will help to illustrate.

EXAMPLE 1

Assume that a user wishes to simulate a loss of all incoming packets meeting a specified criterion. As discussed above, the user may write an application with calls to the PML API. The application may open a PML socket and provide the socket with a filter that defines the specified criterion, and the application may instruct PML to apply the filter just above the link layer in the stack. PML will responsively trap the specified packets and divert them to user space. The application may then delete the packets, thereby preventing the packets from ever reaching levels of the stack higher than the link layer.

EXAMPLE 2

Assume that a user wishes to modify some aspect of all incoming packets before allowing the packets to proceed above the link layer of the stack. As discussed above, the user may write an application with calls to the PML API, opening a PML socket and supplying a filter that will match all incoming packets. After the packets are processed by the link layer, PML will trap and divert the packets to user space. The application may then modify aspects of the packets, such as adding IP or TCP options. In turn, the application may instruct PML to inject the packets back into the same point of the stack at which they were trapped. The packets as modified in user space would then continue to be processed up through the stack.

EXAMPLE 3

Assume that a user wishes to simulate the arrival of a packet at the machine. To do so, the user may write an application with calls to the PML API, opening a PML socket. The application may then create a PML packet object destined for receipt by the machine and the application, and specify for its PML header that the packet is to be processed by the protocol stack in an upward (incoming) direction beginning at just above the data link layer. The application may in turn instruct PML to inject the packet into the protocol stack. As a result, the packet would be processed by the stack as an incoming packet for the machine.

EXAMPLE 4

Assume that a user wishes to prevent a certain packet from being transmitted over the network to another machine, but the user wishes to allow the packet to be processed by the higher levels of the protocol stack (such as to obtain a sequence number at the TCP layer). The user may write an application with calls to the PML API, opening a socket an supplying a filter that will match the desired packet. The application may instruct PML to apply the filter just before the packet enters the physical layer of the stack (below the link layer). Upon receipt of the trapped packet, the application may then delete the packet as described above.

EXAMPLE 5

Assume that a user wishes to specify a few fields of the TCP header in an outgoing packet while leaving the vast majority of the TCP header intact. In the existing art, the user can accomplish this by creating full TCP and IP headers from scratch and then writing the packet to the IP layer of the stack using a "raw socket." Doing so is fraught with difficulty, however, because a TCP header is very complicated, and errors are likely to occur. With the present invention, a user may instead make use of the kernel stack code, which is already designed to accurately supply the complex TCP header.

Provided with the invention, a user may simply write an application with calls to the PML API, and create a PML socket with a filter designed to trap the desired outgoing packet. The application may instruct PML to trap the packet just below the TCP layer, after the kernel stack code has already created the full TCP header for the packet. Upon receipt of the trapped packet, the application is then left with the relatively small task of modifying (rather than creating) the TCP header as desired. The application may then instruct PML to inject the packet back into the stack in an outgoing direction at the point where it was trapped, thereby allowing the stack to continue processing the now-modified packet as normal.

SOURCE CODE LISTING

The microfiche appendix to this application contains a printout of source code for a PML system operating in accordance with a preferred embodiment of the present invention. This code is written in C and C++, to be compiled, for instance, by the GNU GCC compiler and run on a computer with an Intel Pentium processor and running the Linux operating system (kernel 2.1.75 or higher).

In the preferred embodiment, this code contains the following routines, which are inserted in the operating system at the specified locations:

(i) The function "pml_intercept_up( )" should be added to the "netif_rx( )" function within the Linux kernel C source code file "/usr/src/linux/net/core/dev.c" just prior to that function's call to add the skb packet to the backlog:

```
if( pml_on)
{
    if( skb->pml_origin == 0)
    {
        if( pml_intercept_up(skb))
        {
            /* interception routine handled packet */
            kfree_skb( skb, FREE_READ);
        };
    };
};
```

(ii) The function "pml_intercept_down( )" should be added to the "do_dev_queue_xmit( )" function within the Linux kernel C source code file "/usr/src/linux/net/core/dev.c" just prior to calling the device's transmit function:

```
if( pml_on)
{
    if( skb->pml_origin == 0)
    {
        if( pml_intercept_down(skb) )
        {
            /* interception routine handled packet */
            dev_kfree_skb(skb, FREE_WRITE);
        };
    };
};
```

(iii) The two functions "pml_intercept_up()" and "pml_intercept_down( )" are defined in kpml.c, as is the variable "pml_on". A forward declaration of the two functions and an extern reference to the variable should be added to the beginning of "/usr/src/linux/net/core/dev.c":
extern int pml_on;
int pml_intercept_up(struct sk_buff* skb);
int pml_intercept_down(struct sk_buff* skb);

(iv) A new field should be entered into the "struct sk_buff" structure defined in the Linux kernel C header file "/usr/src/linux/include/linux/skbuff.h":
nt pml_origin;

(v) This field should be initialized by adding the following code to the Linux kernel C source file "/usr/src/linuxlnet/core/skbuff.c" in the "alloc_skb()" function:
skb->pml_origin=0;

(vi) The file "/usr/src/linux/drivers/block/Makefile" should be altered to include the kpml.c PML kernel source code in its compilation list:
L_OBJS+=kpml.o (vii) The files "kpml.c" and "kpml.h" should be added to the directory "/usr/sic/linux/drivers/block". These two files are included in the microfiche appendix.

(viii) A call to initialize the PML kernel code should be made in the file "/usr/src/linux/drivers/block/ll_rw_blk.c":
pml_init( );

(ix) Also, a forward declaration of this function should be included in the same file:

long pml_init( long kmem_start);
(x) A pointer to the "pml_setup( )" function should be added to the setup function call list in "/usr/src/linux/init/main.c":
{"pml=", pml_setup },
(xi) Also, a forward declaration of this function should be included in the same file:
extern void pml_setup( char* command, int* integers);

Preferred embodiments of the present invention have been illustrated and described. It will be understood, however, that changes and modifications may be made to the invention without deviating from the spirit and scope of the invention, as defined by the following claims.

We claim:

1. In a computer device of the type having a user space containing a set of application code and a kernel space containing a set of kernel stack code, the kernel stack code including a set of machine language instructions executable by a processor for processing data packets according to a protocol stack, packets being processed through the kernel space by the kernel stack code, a method comprising, in combination:
creating a PML socket;
creating a PML packet filter for the PML socket;
applying the PML packet filter to tap a packet bound for processing by the kernel stack code,
copying the packet from kernel space into user space;
deleting the packet from kernel space to prevent continued processing of the packet by the kernel stack code;
operating on the packet in user space;
copying the packet from user space into kernel space; and
calling a line of the kernel stack code to cause the kernel stack code to process the packet.

2. A method as claimed in claim 1, wherein the step of applying the PML packet filter to tap a packet bound for processing by the kernel stack code occurs after the kernel stack code has begun processing the packet.

3. A method as claimed in claim 1, wherein the step of applying the PML packet filter to tap a packet bound for processing by the kernel stack code occurs at a location other than at the top of the kernel protocol stack.

4. A method as claimed in claim 1, wherein the protocol stack comprises layers of a TCP/IP protocol stack.

5. A method as claimed in claim 1, wherein the packet is an outgoing packet and further comprising copying the outgoing packet from user space to kernel, whereby the step of applying the PML packet filter to tap a packet bound for processing by the kernel stack code comprises applying the PML packet filter to tap the outgoing packet.

6. A method as claimed in claim 1, wherein the packet is selected from the group consisting of a TCP packet and a UDP packet.

7. A method as claimed in claim 1, wherein copying the packet from the user space into the kernel space produces an copied-packet, and further comprising:
the kernel stack code processing the copied-packet according the protocol stack.

8. A method as claimed in claim 1, wherein the steps of copying the packet from kernel space into user space and deleting the packet from kernel space occur after the kernel stack code has begun processing the packet.

9. A method as claimed in claim 1, wherein the step of copying the packet from kernel space into user space occurs after the kernel stack code has begun processing the packet.

10. A method as claimed in claim 1, wherein the step of deleting the packet from kernel space to prevent continued processing of the packet by the kernel stack code occurs after the kernel stack code has begun processing the packet.

11. A method as claimed in claim 1, wherein the step of copying the packet from kernel space into user space occurs at a location other than at the top of the kernel protocol stack.

12. A method as claimed in claim 1, wherein the step of deleting the packet from kernel space to prevent continued processing of the packet by the kernel stack code occurs at a location other than at the top of the kernel protocol stack.

13. In a computer device of the type having a user space containing a set of application code and a kernel space containing a set of kernel stack code, the kernel stack code including a set of machine language instructions executable by a processor for processing data packets according to a protocol stack, a set of computer executable software routines comprising, in combination:
machine language instructions for creating a PML socket;
machine language instructions for creating a PML packet filter for the PML socket;
machine language instructions for applying the PML packet filter to tap a packet bound for processing by the kernel stack code,
machine language instructions for copying the packet from kernel space into user space;
machine language instructions for deleting the packet from kernel space to prevent continued processing of the packet by the kernel stack code;
machine language instructions for operating on the packet in user space;
machine language instructions for copying the packet from user space into kernel space; and
machine language instructions for calling a line of the kernel stack code to cause the kernel stack code to process the packet.

14. A set of computer executable software routines as claimed in claim 13, wherein the protocol stack comprises layers of a TCP/IP protocol stack.

15. A set of computer executable software routines as claimed in claim 13, wherein the packet is an outgoing packet and further comprising machine language instructions for copying the outgoing packet from user space to kernel, whereby the machine language instructions for applying the PML packet filter to tap a packet bound for processing by the kernel stack code comprises machine language instruction for applying the PML packet filter to tap the outgoing packet.

16. A set of computer executable software routines as claimed in claim 13, wherein the packet is selected from the group consisting of a TCP packet and a UDP packet.

17. A set of computer executable software routines as claimed in claim 13, wherein a plurality of the software routines define an application programming interface.

18. A set of computer executable software routines as claimed in claim 13, wherein when executed by the processor, the set of machine language instructions for copying the packet from the user space into the kernel space produces an copied-packet, and further comprising:
a set of machine language instructions for processing the copied-packet according the protocol stack.

19. A set of computer executable software routines as claimed in claim 13, wherein the machine language instructions for (i) applying the PML packet filter to tap a packet bound for processing by the kernel stack code, (ii) copying the packet from kernel space into user space, and (iii) deleting the packet from kernel space are executable by the processor after the kernel stack code has begun processing the packet.

20. A set of computer executable software routines as claimed in claim 13, wherein the machine language instructions for applying the PML packet filter to tap a packet bound for processing by the kernel stack code comprise machine language instructions for applying the PML packet filter to tap a packet bound for processing by the kernel stack code for after the kernel stack code has begun processing the packet.

21. A set of computer executable software routines as claimed in claim 13, wherein the machine language instructions for copying the packet from kernel space into user space comprise the machine language instructions for copying the packet from kernel space into user space after the kernel stack code has begun processing the packet.

22. A set of computer executable software routines as claimed in claim 13, wherein the machine language instructions for applying the PML packet filter to tap a packet bound for processing by the kernel stack code comprise machine language instructions for applying the PML packet filter to tap a packet bound for processing by the kernel stack code at a location other than at the top of the kernel protocol stack.

23. A set of computer executable software routines as claimed in claim 13, wherein the machine language instructions for applying the PML packet filter to tap a packet bound for processing by the kernel stack code comprise machine language instructions for applying the PML packet filter to tap a packet bound for processing by the kernel stack code at a location other than at the top of the kernel protocol stack.

24. A set of computer executable software routines as claimed in claim 13, wherein the machine language instructions for copying the packet from kernel space into user space comprise machine language instructions for copying the packet from kernel space into user space at a location other than at the top of the kernel protocol stack.

25. A set of computer executable software routines as claimed in claim 13, wherein the machine language instructions for deleting the packet from kernel space to prevent continued processing of the packet by the kernel stack code comprise machine language instructions for deleting the packet from kernel space to prevent continued processing of the packet by the kernel stack code at a location other than at the top of the kernel protocol stack.

26. A set of computer executable software routines as claimed in claim 13, wherein machine language instructions for (i) copying the packet from kernel space into user space, (ii) deleting the packet from kernel space to prevent continued processing of the packet by the kernel stack code, (iii) operating on the packet in user space, and (iv) copying the packet from user space into kernel space are maintained in a packet modification library.

* * * * *